(12) United States Patent
Diaz et al.

(10) Patent No.: US 11,933,698 B2
(45) Date of Patent: Mar. 19, 2024

(54) SYSTEM FOR COLLECTING LIQUID SAMPLES FROM A DISTANCE

(71) Applicant: Elemental Scientific, Inc., Omaha, NE (US)

(72) Inventors: David Diaz, Omaha, NE (US); Jonathan Hein, Bennington, NE (US); Kyle W. Uhlmeyer, Omaha, NE (US); Daniel R. Wiederin, Omaha, NE (US); Tyler Yost, Omaha, NE (US); Kevin Wiederin, Omaha, NE (US)

(73) Assignee: Elemental Scientific, Inc., Omaha, NE (US)

(*) Notice: Subject to any disclaimer, the term of this patent is extended or adjusted under 35 U.S.C. 154(b) by 73 days.

(21) Appl. No.: 17/368,056

(22) Filed: Jul. 6, 2021

(65) Prior Publication Data

US 2021/0381931 A1 Dec. 9, 2021

Related U.S. Application Data

(63) Continuation of application No. 15/120,897, filed as application No. PCT/US2015/018177 on Feb. 27, 2015, now Pat. No. 11,054,344.
(Continued)

(51) Int. Cl.
*G01N 1/28* (2006.01)
*G01N 1/10* (2006.01)
(Continued)

(52) U.S. Cl.
CPC .................. *G01N 1/10* (2013.01); *G01N 1/14* (2013.01); *G01N 35/00732* (2013.01);
(Continued)

(58) Field of Classification Search
None
See application file for complete search history.

(56) References Cited

U.S. PATENT DOCUMENTS

| | | |
|---|---|---|
| 3,241,432 A | 3/1966 | Skeggs et al. |
| 3,668,936 A | 6/1972 | Herron |
| (Continued) | | |

FOREIGN PATENT DOCUMENTS

| | | |
|---|---|---|
| CN | 101881376 A | 11/2010 |
| EP | 0163976 A1 | 12/1985 |
| (Continued) | | |

OTHER PUBLICATIONS

Notice of Preliminary Rejection for Korean Application No. 10-2018-7002101, dated Apr. 10, 2022.
(Continued)

*Primary Examiner* — Paul S Hyun
(74) *Attorney, Agent, or Firm* — Kevin E. West; Advent, LLP

(57) ABSTRACT

A system includes an analysis system at a first location and one or more remote sampling systems at a second location remote from the first location. A sampling system can be configured to receive a remote liquid sample. The system also includes a sample transfer line configured to transport gas from the second location to the first location. The sample transfer line is configured to selectively couple with a remote sampling for supplying a continuous liquid sample segment to the sample transfer line. The system can further include a sample receiving line at the first location. The sample receiving line is configured to selectively couple with the sample transfer line and the analysis system to receive the continuous liquid sample segment and supply the sample to an analysis device.

5 Claims, 7 Drawing Sheets

Related U.S. Application Data

(60) Provisional application No. 61/946,256, filed on Feb. 28, 2014, provisional application No. 61/945,264, filed on Feb. 27, 2014.

(51) Int. Cl.
  *G01N 1/14* (2006.01)
  *G01N 35/00* (2006.01)
  *G01N 35/10* (2006.01)
  *H01J 49/04* (2006.01)
  *G01N 1/00* (2006.01)

(52) U.S. Cl.
  CPC ... *G01N 35/00871* (2013.01); *G01N 35/1097* (2013.01); *H01J 49/045* (2013.01); *G01N 2001/002* (2013.01)

(56) References Cited

U.S. PATENT DOCUMENTS

| | | |
|---|---|---|
| 3,834,227 A | 9/1974 | Patterson et al. |
| 4,100,797 A | 7/1978 | Oberhardt et al. |
| 4,114,144 A | 9/1978 | Hyman |
| 4,151,086 A | 4/1979 | Brooks |
| 4,210,809 A | 7/1980 | Pelavin |
| 4,328,185 A | 5/1982 | Reasons et al. |
| 4,366,384 A | 12/1982 | Jensen |
| 4,517,302 A | 5/1985 | Saros |
| 4,662,208 A | 5/1987 | Metzner et al. |
| 4,695,431 A | 9/1987 | Farrell |
| 4,752,690 A | 6/1988 | James |
| 4,797,191 A | 1/1989 | Metzner et al. |
| 4,865,993 A | 9/1989 | Cassaday |
| 5,192,504 A | 3/1993 | Cassaday |
| 5,260,665 A | 11/1993 | Goldberg et al. |
| 5,504,010 A | 4/1996 | Mitani et al. |
| 5,654,551 A | 8/1997 | Watt et al. |
| 5,708,220 A | 1/1998 | Burge |
| 6,241,950 B1 | 6/2001 | Veelenturf et al. |
| 6,408,679 B1 | 6/2002 | Kline-Schoder et al. |
| 6,528,018 B1 | 3/2003 | Berndt |
| 6,561,046 B1 | 5/2003 | Taylor et al. |
| 7,588,725 B2 | 9/2009 | Ozbal et al. |
| 7,661,294 B2 | 2/2010 | Dam |
| 7,805,978 B2 | 10/2010 | Riley et al. |
| 7,818,992 B2 | 10/2010 | Riley et al. |
| 7,905,099 B2 | 3/2011 | Justak |
| 7,981,082 B2 | 7/2011 | Wang et al. |
| 8,119,065 B2 | 2/2012 | Bowers et al. |
| 8,225,639 B2 | 7/2012 | Riley et al. |
| 9,283,332 B2 | 3/2016 | Unverdorben |
| 10,585,075 B2 | 3/2020 | Diaz et al. |
| 10,585,108 B2 | 3/2020 | Diaz et al. |
| 2001/0037674 A1 | 11/2001 | Petro et al. |
| 2002/0064880 A1 | 5/2002 | Merten et al. |
| 2003/0013200 A1 | 1/2003 | Pai et al. |
| 2003/0092393 A1 | 5/2003 | Tokhtuev et al. |
| 2003/0138357 A1 | 7/2003 | Adolfsen |
| 2004/0002166 A1 | 1/2004 | Wiederin |
| 2005/0087027 A1 | 4/2005 | Widmer |
| 2005/0123970 A1 | 6/2005 | Ozbal et al. |
| 2005/0194318 A1 | 9/2005 | Ozbal et al. |
| 2006/0021419 A1 | 2/2006 | Cassidy et al. |
| 2007/0117212 A1 | 5/2007 | Kautz et al. |
| 2008/0302178 A1 | 12/2008 | Karg |
| 2009/0145203 A1 | 6/2009 | Vorm et al. |
| 2012/0132013 A1 | 5/2012 | Glatz et al. |
| 2014/0165703 A1 | 6/2014 | Wilt et al. |
| 2015/0226710 A1 | 8/2015 | Hochgraeber |
| 2016/0131617 A1 | 5/2016 | Burnett et al. |
| 2016/0370262 A1 | 12/2016 | Diaz et al. |
| 2020/0203138 A1 | 6/2020 | Shultz |

FOREIGN PATENT DOCUMENTS

| | | |
|---|---|---|
| EP | 0276304 A4 | 4/1990 |
| EP | 0276304 B1 | 6/1992 |
| JP | S55125472 A | 9/1980 |
| JP | S58103639 A | 6/1983 |
| JP | S6129751 A | 2/1986 |
| JP | H01500541 A | 2/1989 |
| JP | H03073860 | 3/1991 |
| JP | H03123836 A | 5/1991 |
| JP | H08304367 A | 11/1996 |
| JP | H11241995 A | 9/1999 |
| JP | 2004333439 A | 11/2004 |
| JP | 2005531009 A | 10/2005 |
| JP | 2007512515 A | 5/2007 |
| JP | 2010071713 A | 4/2010 |
| JP | 2011503549 A | 1/2011 |
| WO | 8801377 A1 | 2/1988 |
| WO | 9911373 A2 | 3/1999 |
| WO | 2004003522 A1 | 1/2004 |

OTHER PUBLICATIONS

Office Action for Japanese Application 2017-566350, dated Dec. 7, 2021.
Preliminary Rejection for Korean Application No. 10-2018-7002101, dated Oct. 20, 2021.
Preliminary Rejection for Korean Application No. 10-2021-7030877, dated Dec. 22, 2021.
Chinese Office Action for Application No. 201580016642.3 dated Aug. 23, 2018.
International Preliminary Report on Patentability for Application No. PCT/US2015/018177 dated Aug. 30, 2016.
International Search Report dated Jun. 4, 2015 for International Application No. PCT/US2015/018177.
Office Action for Chinese Application No. 201580016642.3, dated Apr. 15, 2019.
Office Action for Chinese Application No. 201580016642.3, dated Aug. 23, 2018.
Office Action for Chinese Application No. 201580016642.3, dated Jan. 19, 2020.
Office Action for Chinese Application No. 201580016642.3, dated Jun. 10, 2020.
Office Action for Chinese Application No. 201680037720.2, dated Dec. 16, 2019.
Office Action for Chinese Patent Application No. 201680037720.2, dated Aug. 17, 2020.
Office Action for Japanese Application No. 2016-572370, dated Feb. 26, 2019.
Office Action for Japanese Patent Application No. 2017-566350, dated Apr. 7, 2020.
Office Action for Japanese Patent Application No. 2017-566350, dated Mar. 23, 2021.
PCT Notification of Transmittal ofThe international Search Report and The Written Opinion of the International Searching Authority, or The Declaration, Appln PCT/US2016/039327 dated Oct. 7, 2016.
Written Opinion dated Jun. 4, 2015 for International Application No. PCT/US2015/018177.
Office Action in Korea for Application No. 10-2022-7005156, dated Jan. 12, 2023.
Notice of Preliminary Rejection in Korea for Patent Application No. 10-2022-7032110, dated May 25, 2023.
Notification of Reason(s) for Refusal for Japanese Patent Application No. 2022-108860, dated Oct. 3, 2023.
First Office Action in China for Application No. 202011474302.4, dated Nov. 28, 2023.

SYSTEM FOR COLLECTING LIQUID SAMPLES FROM A DISTANCE

CROSS-REFERENCE TO RELATED APPLICATIONS

The present application is a continuation of U.S. application Ser. No. 15/120,897, filed Aug. 23, 2016, and titled "SYSTEM FOR COLLECTING LIQUID SAMPLES FROM A DISTANCE" (now U.S. Pat. No. 11,054,344), which in turn is a 371 of PCT/US2015/018177, filed Feb. 27, 2015, which in turn claims the benefit under 35 U.S.C. § 119(e) of U.S. Provisional Application Ser. No. 61/945,264, filed Feb. 27, 2014, and titled "SAMPLE ANALYSIS SYSTEM OPERABLE OVER LONG DISTANCES" and U.S. Provisional Application Ser. No. 61/946,256, filed Feb. 28, 2014, and titled "SAMPLE ANALYSIS SYSTEM OPERABLE OVER LONG DISTANCES". U.S. Provisional Application Ser. No. 61/945,264 and U.S. Provisional Application Ser. No. 61/946,256 and U.S. application Ser. No. 15/120,897 are herein incorporated by reference in their entirety.

BACKGROUND

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (TCP/ICP-MS), an Inductively Coupled Plasma Atomic Emission Spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

SUMMARY

A system includes an analysis system at a first location and one or more remote sampling systems a second location remote from the first location. A sampling system can be configured to receive and transport a continuous liquid sample segment through a sample transfer line. The system also includes a pressurized gas supply to transport liquid sample of sufficient volume for the analysis from the second location to the first location. The sample transfer line is configured to couple with a remote sampling system for driving and transporting liquid samples to the first location. The system can further include a sample receiving line at the first location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. Any dimensions included in the accompanying figures are provided by way of example only and are not meant to limit the present disclosure.

DETAILED DESCRIPTION

Figure 1:
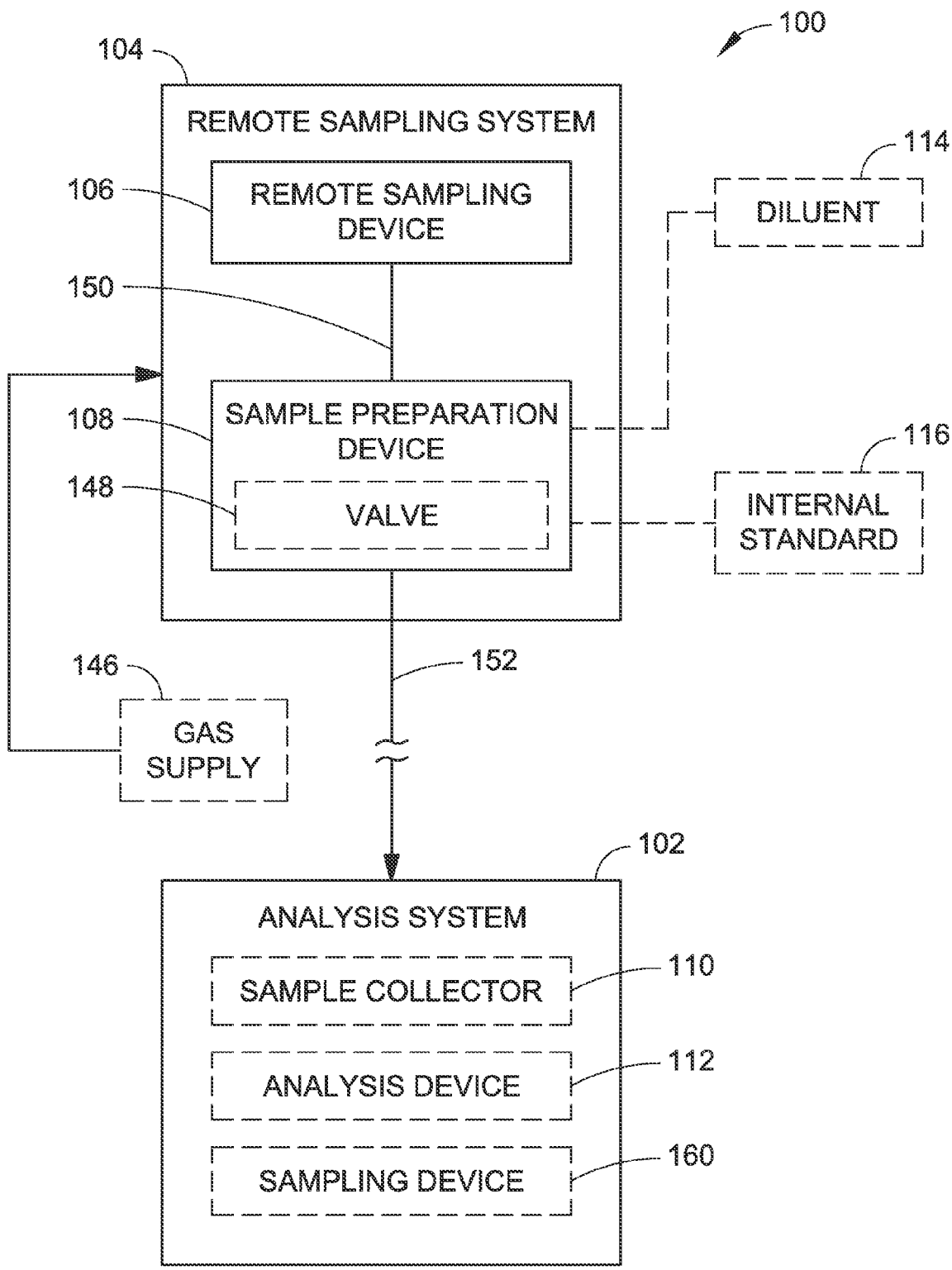
FIG. 1 is a partial line diagram illustrating a system configured to analyze samples transported over long distances in accordance with example embodiments of the present disclosure.
Figure 2A:
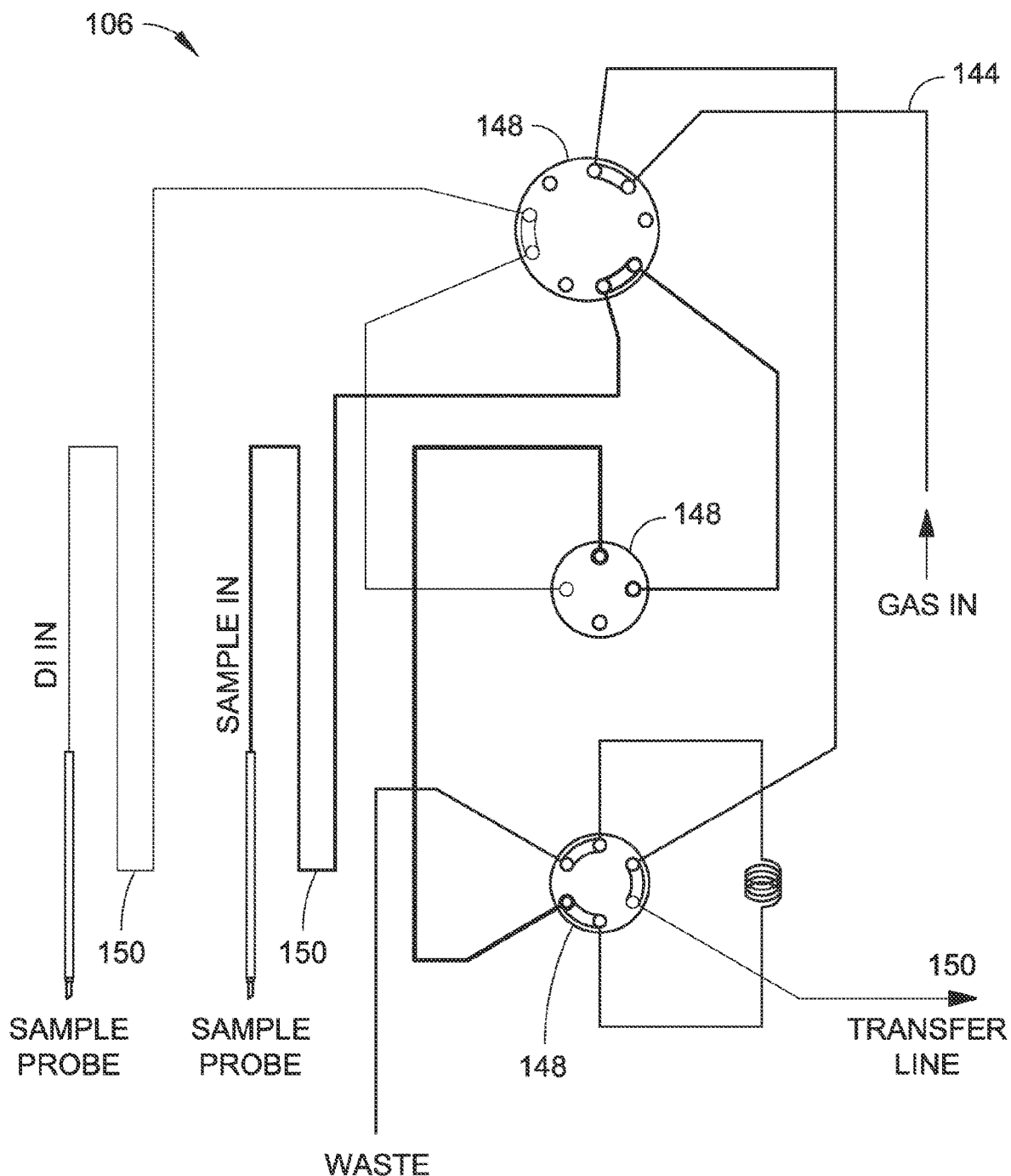
FIG. 2A is an environmental view illustrating a remote sampling device used in a remote sampling system, in accordance with example embodiments of the present disclosure.
Figure 2B:
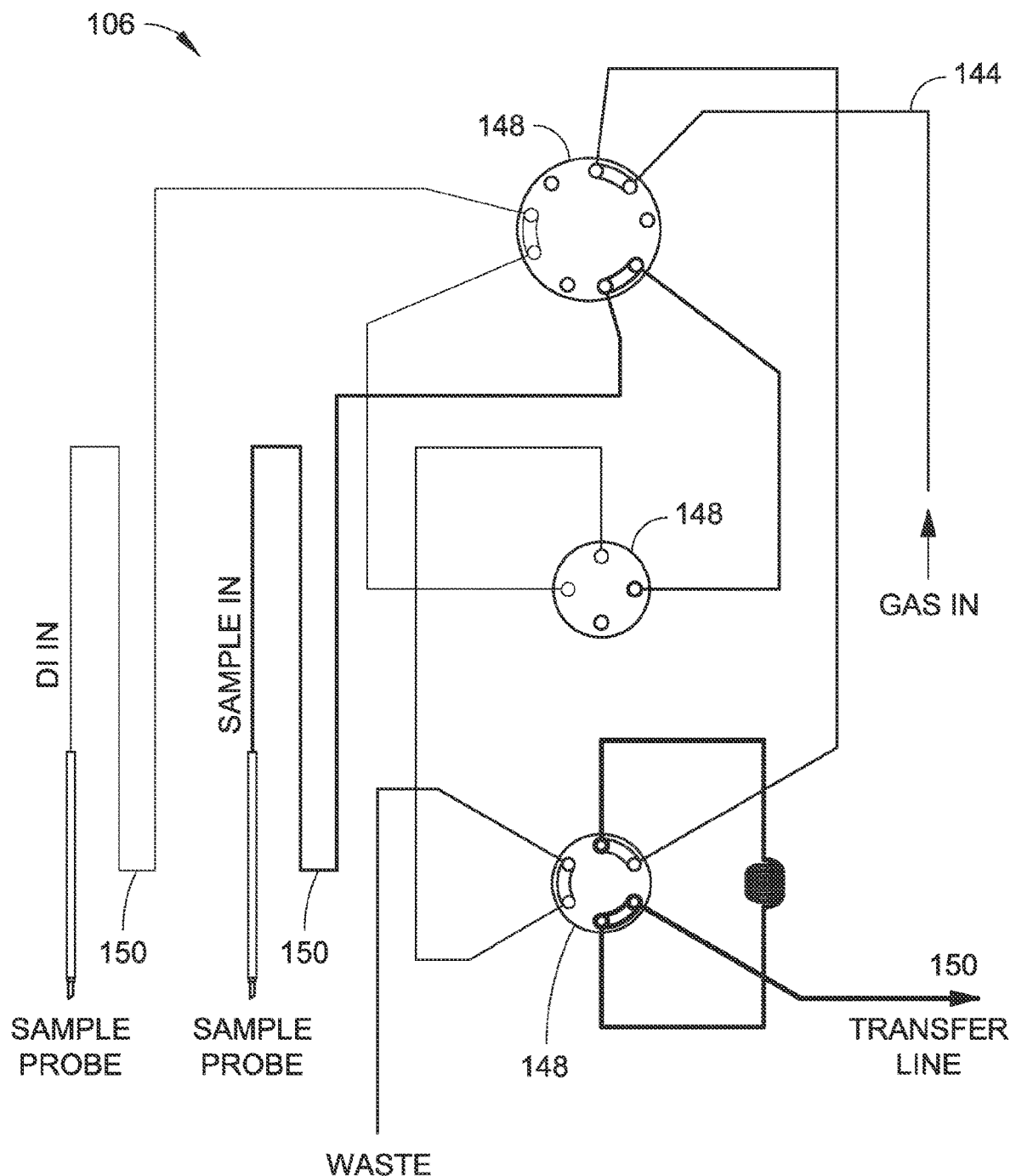
FIG. 2B is an environmental view illustrating a remote sampling device used in a remote sampling system, in accordance with example embodiments of the present disclosure.
Figure 3A:
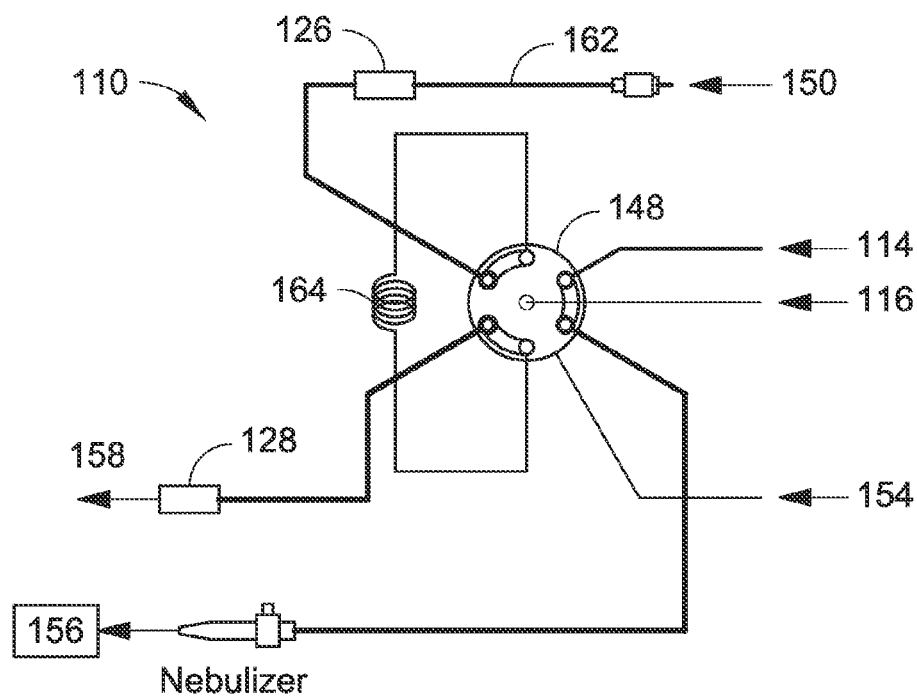
FIG. 3A is an environmental view illustrating an analysis device used in an analysis system, in accordance with example embodiments of the present disclosure.
Figure 3B:
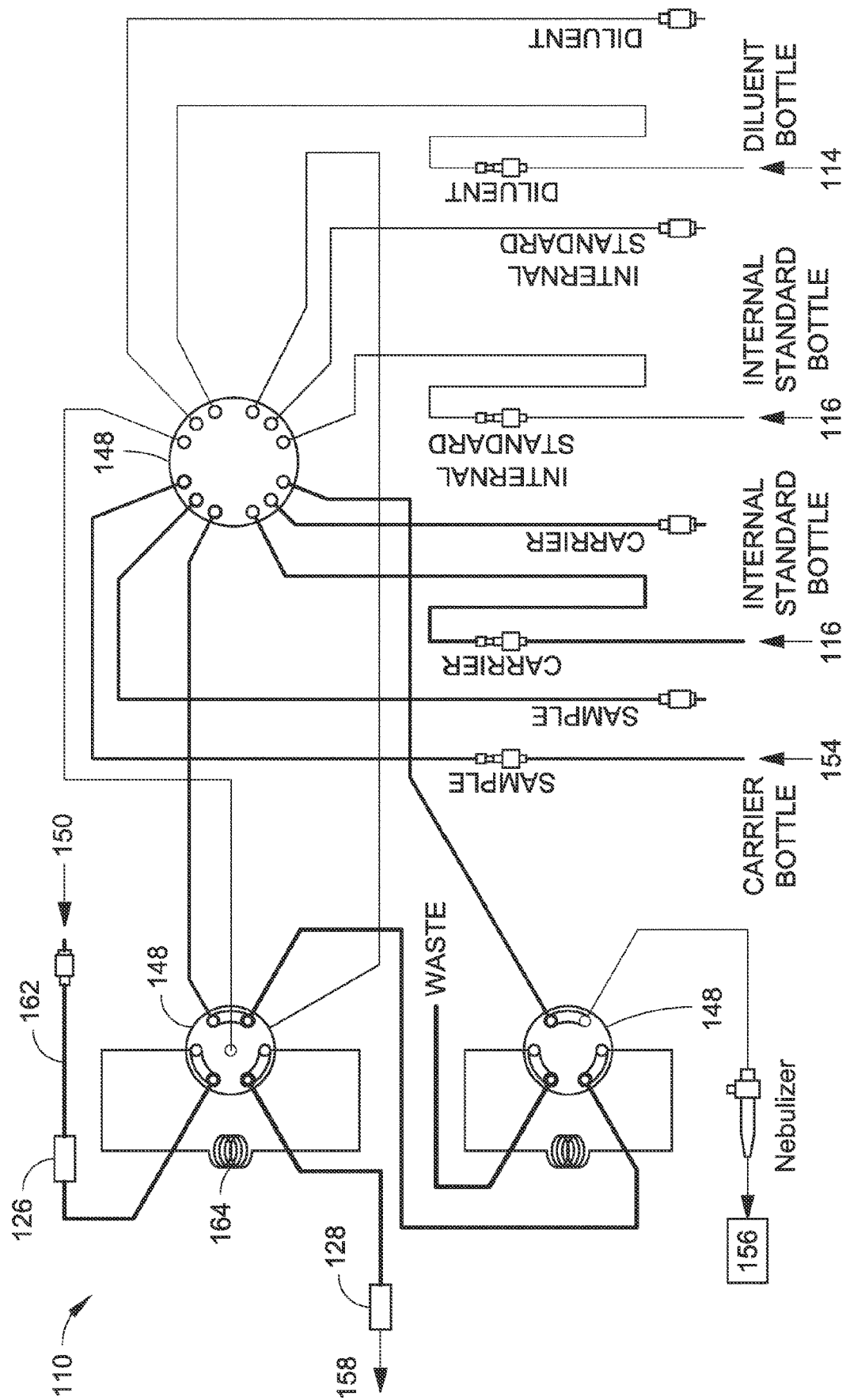
FIG. 3B is an environmental view illustrating an analysis device used in an analysis system, in accordance with example embodiments of the present disclosure.
Figure 4:
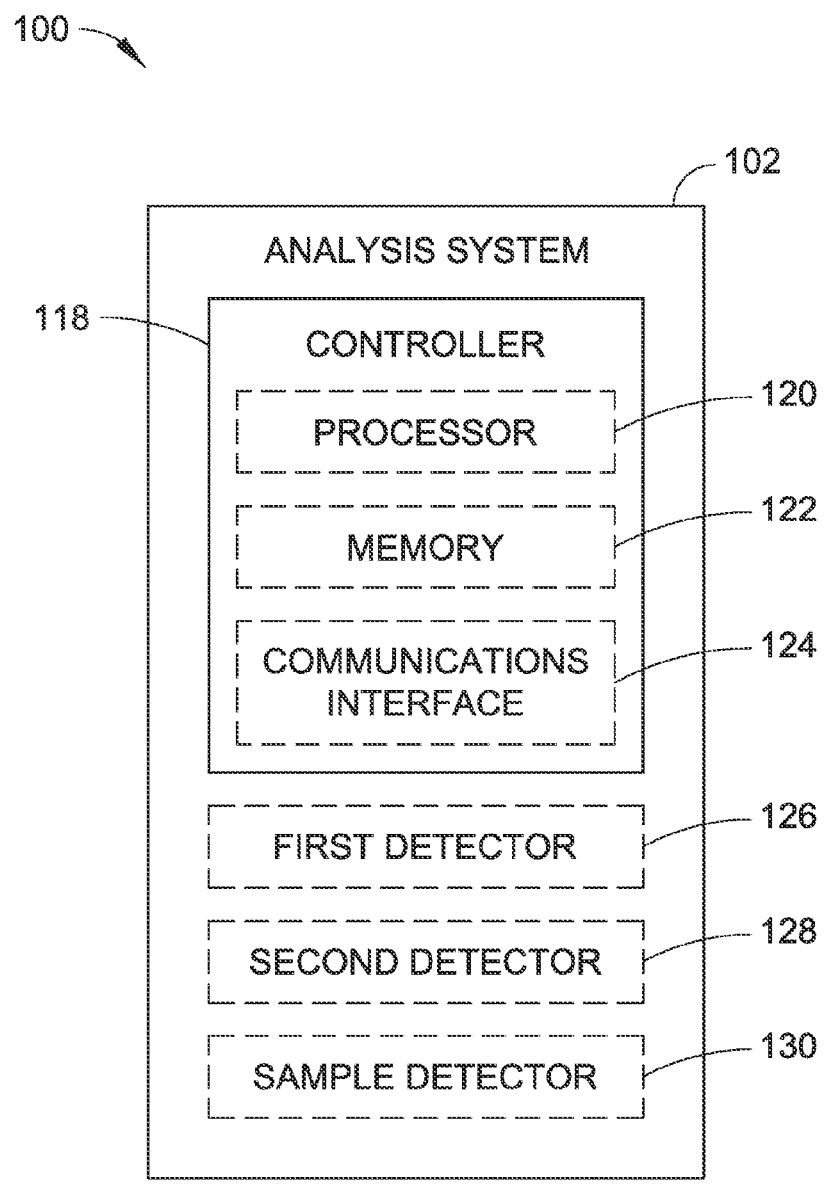
FIG. 4 is a partial line diagram illustrating an analysis system within the system configured to analyze samples transported over long distances in accordance with example embodiments of the present disclosure.
Figure 5:
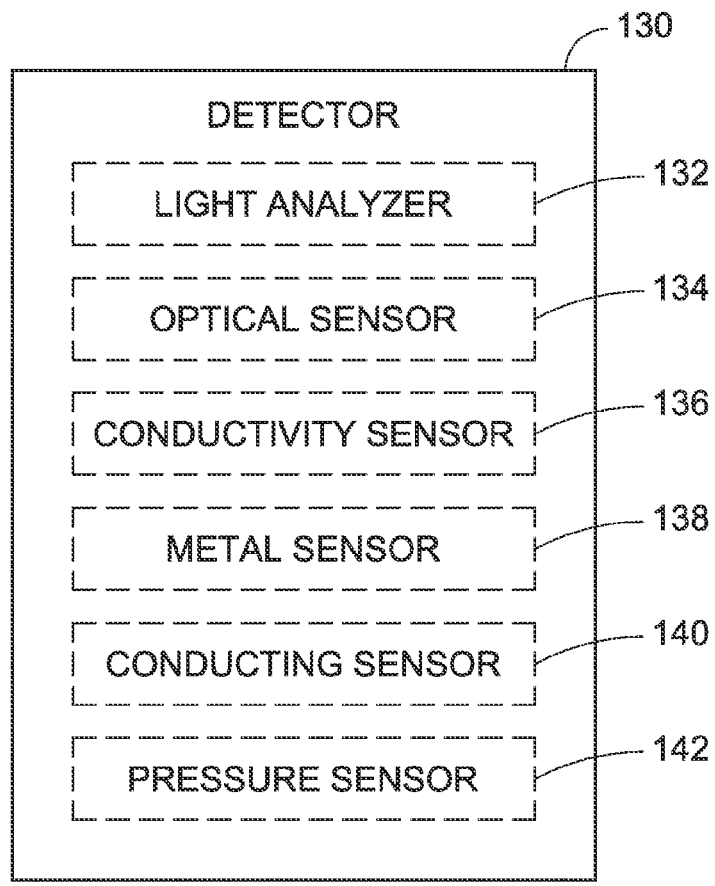
FIG. 5 is a partial line diagram illustrating a detector that can be utilized within the analysis system shown in FIG. 4 in accordance with example embodiments of the present disclosure.

Referring generally to FIGS. 1 through 5, example systems configured to analyze samples transported over long distances are described. A system 100 includes an analysis system 102 at a first location. The system 100 can also include one or more remote sampling systems 104 at a second location remote from the first location. The system 100 can also include one or more remote sampling system(s) 104 at a third location, a fourth location, and so forth, where the third location and/or the fourth location are remote from the first location. In some embodiments, the system 100 also may include one or more remote sampling system(s) 104 at the first location (e.g., proximate to the analysis system 102). For example, a sampling systems 104 at the first location may include an autosampler coupled with the analysis system 102. The one or more sampling systems 104 can be operable to receive samples from the first location, the second location, the third location, the fourth location, and so forth, and the system 100 can be operable to deliver the samples to the analysis system 102 for analysis.

A remote sampling system 104 can be configured to receive a sample 150 and prepare the sample 150 for delivery and/or analysis. In embodiments, the remote sampling system 104 can be disposed various distances from the analysis system 102 (e.g., 1 m, 5 m, 50 m, 100 m, 1000 m, etc.). In implementations, the remote sampling system 104 can include a remote sampling device 106 and a sample preparation device 108. The sample preparation device 108 may further include a valve 148, such as a flow-through valve. In implementations, the remote sampling device 106 can include a device configured for collecting a sample 150 from a sample stream (e.g., a liquid, such as waste water, rinse water, etc.). The remote sampling device 106 can include components, such as pumps, valves, tubing, sensors, etc. The sample preparation device 108 can include a device configured to prepare a collected sample 150 from the remote sampling device 106 using a diluent 114, an internal standard 116, a carrier 154, etc.

In some embodiments, a sample 150 may be prepared (e.g., prepared sample 152) for delivery and/or analysis using one or more preparation techniques, including, but not necessarily limited to: dilution, pre-concentration, the addition of one or more calibration standards, and so forth. For example, a viscous sample 150 can be remotely diluted (e.g., by sample preparation device 108) before being delivered to the analysis system 102 (e.g., to prevent the sample 150 from separating during delivery). In some embodiments, sample dilution may be dynamically adjusted (e.g., automatically adjusted) to move sample(s) 150 through the system at a desired rate. For instance, diluent 114 added to a particular sample or type of sample is increased when a sample 150 moves through the system 100 too slowly (e.g., as measured by the transfer time from the second location to the first location). In another example, one liter (1 L) of seawater can be remotely pre-concentrated before delivery to the analysis system 102. In a further example, electrostatic concentration is used on material from an air sample to pre-concentrate possible airborne contaminants. In some embodiments, in-line dilution and/or calibration is automatically performed by the system 100. For instance, a sample preparation device 108 can add one or more internal standards to a sample delivered to the analysis system 102 to calibrate the analysis system 102.

In embodiments of the disclosure, the analysis system 102 can include a sample collector 110 and/or sample detector 130 configured to collect a sample 150 from the sample transfer line 144 and/or at least one analysis device 112 configured to analyze samples to determine trace element concentrations, isotope ratios, and so forth (e.g., in liquid samples). Additionally, the analysis system 102 may include a sampling device 160 configured to collect a sample 150 that is local to the analysis system 102. One example of an analysis device 112 may include ICP spectrometry instrumentation. The system 100 and/or analysis system 102 can be configured to report analyte concentration at a location over time. In some embodiments, the analysis device 112 may be configured to detect one or more trace metals in a sample 150. In other embodiments, the analysis device 112 may be configured for ion chromatography. For example, ions and/or cations can be collected in a sample 150 and delivered to a chromatograph analysis device 112. In further embodiments, organic molecules, proteins, and so on, can be collected in samples and delivered to a high resolution time-of-flight (HR-ToF) mass spectrometer analysis device 112 (e.g., using a nebulizer 156). Thus, systems as described herein can be used for various applications, including, but not necessarily limited to: pharmaceutical applications (e.g., with a central mass spectrometer analysis device connected to multiple pharmaceutical reactors), waste monitoring of one or more waste streams, and so forth. For example, a waste stream may be continuously monitored for contaminants and diverted to a tank when a contaminant is detected.

The remote sampling system 104 can be configured to selectively couple with at least one sample transfer line 144 so that the remote sampling system 104 is operable to be in fluid communication with the sample transfer line 144 for supplying a continuous liquid sample segment 150 to the sample transfer line 144. For example, the remote sampling system 104 may be configured to collect a sample 150 and supply the sample 150 to the sample transfer line 144 using, for instance, a flow-through valve 148, coupling the remote sampling system 104 to the sample transfer line 144. The supply of the sample 150 to the sample transfer line 144 can be referred to as a "pitch." The sample transfer line 144 can be coupled with a gas supply 146 and can be configured to transport gas from the second location (and possibly the third location, the fourth location, and so forth) to the first location. In this manner, liquid sample segments supplied by the remote sampling system 104 are collected in a gas stream, and transported to the location of the analysis system 102 using gas pressure sample transfer.

In some embodiments, gas in the sample transfer line 144 can include an inert gas, including, but not necessarily limited to: nitrogen gas, argon gas, and so forth. In some embodiments, the sample transfer line 144 may include an unsegmented or minimally segmented tube having an inside diameter of eight-tenths of a millimeter (0.8 mm). However, an inside diameter of eight-tenths of a millimeter is provided by way of example only and is not meant to limit the present disclosure. In other embodiments, the sample transfer line 144 may include an inside diameter greater than eight-tenths of a millimeter and/or an inside diameter less than eight-tenths of a millimeter. In some embodiments, pressure in the sample transfer line 144 can range from at least approximately four (4) bar to ten (10) bar. However, this range is provided by way of example only and is not meant to limit the present disclosure. In other embodiments, pressure in the sample transfer line 144 may be greater than ten bar and/or less than four bar. Further, in some specific embodiments, the pressure in the sample transfer line 144 may be adjusted so that samples 150 are dispensed in a generally upward direction (e.g., vertically).

In some examples, the sample transfer line 144 can be coupled with a remote sampling system 104 in fluid communication with a first liquid bath (or chemical bath) and an analysis system 102 in fluid communication with a second liquid bath (or chemical bath). In embodiments of the disclosure, the system 100 may include one or more leak sensors (e.g., mounted in a trough) to prevent or minimize overflow at the first location and/or one or more remote locations. A pump, such as a syringe pump or a vacuum pump, may be used to load sample into the sampling device. A valve 148 may be used to select the sample 150 at the remote sampling system 104, and the sample 150 can be supplied to the sample transfer line 144, which can deliver the sample 150 to the analysis system 102 at the first location. Another pump, such as a diaphragm pump, may be used to pump a drain on the analysis system 102 and pull the sample 150 from the sample transfer line 144.

The system 100 can be implemented as an enclosed sampling system, where the gas and samples in the sample transfer line 144 are not exposed to the surrounding environment. In some embodiments, one or more sample lines of the remote sampling system 104 may be cleaned between sample deliveries. Further, the sample transfer line 144 may be cleaned (e.g., using a cleaning solution) between samples 150.

The sample transfer line 144 can be configured to selectively couple with a sample receiving line 162 (e.g., a sample loop 164) at the first location so that the sample loop 164 is operable to be in fluid communication with the sample transfer line 144 to receive a continuous liquid sample segment. The delivery of the continuous liquid sample segment to the sample loop 164 can be referred to as a "catch." The sample loop 164 is also configured to selectively couple with the analysis device 112 so that the sample loop 164 is operable to be in fluid communication with the analysis device 112 to supply the continuous liquid sample segment to the analysis device 112. In embodiments of the disclosure, the analysis system 102 can include a first detector 126 configured to determine that a continuous liquid sample segment has entered the sample loop 164 and a second detector 128 configured to determine that the sample loop 164 contains a sufficient amount of the continuous liquid sample segment for analysis by the analysis system 102. In one example, a sufficient amount of the continuous liquid sample can include enough liquid sample to send to the analysis device 112. Another example of a sufficient amount of the continuous liquid sample can include a continuous liquid sample between the first detector 126 and the second detector 128. In implementations, the first detector 126 and/or the second detector 128 may include a light analyzer 132, an optical sensor 134, a conductivity sensor 136, a metal sensor 138, a conducting sensor 140, and/or a pressure sensor 142. It is contemplated that the first detector 126 and/or the second detector 128 may include other sensors. For example, the first detector 126 may include a light analyzer 132 that detects when the sample 150 enters the sample loop 164, and the second detector 128 may include another light analyzer 132 that detects when the sample loop 164 is filled. This example can be referred to as a "successful catch." It should be noted that the light analyzers 132 are provided by way of example only and are not meant to limit the present disclosure. Other example detectors include, but are not necessarily limited to: optical sensors, conductivity sensors, metal sensors, conducting sensors, pressure sensors, and so on.

In embodiments of the disclosure, the quantity of sample collected by the remote sampling system 104 is adjusted to provide a sufficient amount of sample 150 for analysis by the analysis device 112. For instance, the ratio of the amount of sample 150 "pitched" to the amount of sample 150 "caught" is at least approximately one and one-quarter (1.25). However, this ratio is provided by way of example only and is not meant to limit the present disclosure. In some embodiments the ratio is greater than one and one-quarter, and in other embodiments the ratio is less than one and one-quarter. In one example, two and one-half milliliters (2.5 mL) of sample 150 (e.g., concentrated sulfuric acid or nitric acid) is pitched, and one milliliter (1 mL) of sample 150 is caught. In another example, one and one-half milliliters (1.5 mL) of sample 150 is pitched, and one milliliter (1 mL) of sample 150 is caught. In embodiments of the disclosure, the amount of sample 150 "pitched" is adjusted to account for the distance between the first location and the second location, the amount of sample transfer line tubing between the first location and the second location, the pressure in the sample transfer line 144, and so forth.

A system 100, including some or all of its components, can operate under computer control. For example, a processor 120 can be included with or in a system 100 to control the components and functions of systems described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the systems. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

For instance, one or more components of the system, such as the analysis system 102, remote sampling system 104, valves 148, pumps, and/or detectors 130 can be coupled with a controller for controlling the collection, delivery, and/or analysis of samples 150. For example, the controller 118 can be configured to switch a valve 148 coupling the sample loop 164 to the analysis system 102 and direct a sample 150 from the sample loop 164 to the analysis system 102 when a successful "catch" is indicated by the first detector 126 and the second detector 128 (e.g., when both sensors detect liquid). Furthermore, the controller 118 can implement functionality to determine an "unsuccessful catch" (e.g., when the sample loop 164 is not filled with enough of a sample 150 for a complete analysis by the analysis system 102). In some embodiments, an "unsuccessful catch" is determined based upon, for instance, variations in the signal intensity of a signal received from a sensor, such as the first detector 126 or the second detector 128. In other embodiments, an "unsuccessful catch" is determined when the first detector 126 has indicated a sample 150 in the sample receiving line 162 and a predetermined amount of time had passed in which the second detector 128 has not indicated a sample 150 in the sample receiving line 162.

In some embodiments, the controller 118 is communicatively coupled with an indicator at a remote location, such as the second location, and provides an indication (e.g., an alert) at the second location when insufficient sample 150 is received at the first location. The indication can be used to initiate (e.g., automatically) additional sample collection and delivery. In some embodiments, the indicator provides an alert to an operator (e.g., via one or more indicator lights). Further, the indication can be timed and/or initiated based upon a one or more predetermined conditions (e.g., only when multiple samples have been missed). In some embodiments, an indicator can also be activated based upon conditions measured at a remote sampling site. For instance, a detector 130 at the second location can be used to determine when sample 150 is being provided to a remote sampling system 104, and the indicator can be activated when sample 150 is not being collected.

In some embodiments, the controller 118 is operable to provide different timing for the collection of samples from different remote locations, and/or for different types of samples 150. For example, the controller 118 can be alerted when a remote sampling system 104 is ready to deliver a sample 150 to the sample transfer line 144, and can initiate transfer of the sample 150 into the sample transfer line 144. The controller 118 can also be communicatively coupled with one or more remote sampling systems 102 to receive (and possibly log/record) identifying information associated with samples 150, and/or to control the order that samples 150 are delivered within the system 100. For example, the controller 118 can remotely queue multiple samples 150 and coordinate their delivery through one or more of the sample transfer lines 144. In this manner, delivery of samples 150 can be coordinated along multiple simultaneous flow paths (e.g., through multiple sample transfer lines 144), one or more samples 150 can be in transfer while one or more additional samples 150 are being taken, and so on.

The controller 118 can include a processor 120, a memory 122, and a communications interface 124. The processor 120 provides processing functionality for the controller 118 and can include any number of processors, micro-controllers, or other processing systems, and resident or external memory for storing data and other information accessed or generated by the controller 118. The processor 120 can execute one or more software programs that implement techniques described herein. The processor 120 is not limited by the materials from which it is formed or the processing mechanisms employed therein and, as such, can be implemented via semiconductor(s) and/or transistors (e.g., using electronic integrated circuit (IC) components), and so forth.

The memory 122 is an example of tangible, computer-readable storage medium that provides storage functionality to store various data associated with operation of the controller 118, such as software programs and/or code segments, or other data to instruct the processor 120, and possibly other components of the controller 118, to perform the functionality described herein. Thus, the memory 122 can store data, such as a program of instructions for operating the system 100 (including its components), and so forth. It should be noted that while a single memory is described, a wide variety of types and combinations of memory (e.g., tangible, non-transitory memory) can be employed. The memory 122 can be integral with the processor 120, can comprise stand-alone memory, or can be a combination of both.

The memory 122 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the system 100 and/or the memory 122 can include removable integrated circuit card (ICC) memory, such as memory 122 provided by a subscriber identity module (SIM) card, a universal subscriber identity module (USIM) card, a universal integrated circuit card (UICC), and so on.

The communications interface 124 is operatively configured to communicate with components of the system. For example, the communications interface 124 can be configured to transmit data for storage in the system 100, retrieve data from storage in the system 100, and so forth. The communications interface 124 is also communicatively coupled with the processor 120 to facilitate data transfer between components of the system 100 and the processor 120 (e.g., for communicating inputs to the processor 120 received from a device communicatively coupled with the controller 118). It should be noted that while the communications interface 124 is described as a component of a controller 118, one or more components of the communications interface 124 can be implemented as external components communicatively coupled to the system 100 via a wired and/or wireless connection. The system 100 can also comprise and/or connect to one or more input/output (I/O) devices (e.g., via the communications interface 124), including, but not necessarily limited to: a display, a mouse, a touchpad, a keyboard, and so on.

The communications interface 124 and/or the processor 120 can be configured to communicate with a variety of different networks, including, but not necessarily limited to: a wide-area cellular telephone network, such as a 3G cellular network, a 4G cellular network, or a global system for mobile communications (GSM) network; a wireless computer communications network, such as a Wi-Fi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 124 can be configured to communicate with a single network or multiple networks across different access points.

In implementations, a variety of analytical devices can make use of the structures, techniques, approaches, and so on described herein. Thus, although systems are described herein, a variety of analytical instruments may make use of the described techniques, approaches, structures, and so on. These devices may be configured with limited functionality (e.g., thin devices) or with robust functionality (e.g., thick devices). Thus, a device's functionality may relate to the device's software or hardware resources, e.g., processing power, memory (e.g., data storage capability), analytical ability, and so on.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:
1. A system, comprising:
a sample receiving line configured for positioning at a first location;

a remote sampling system configured for positioning at a second location remote from the first location, the remote sampling system including a remote sampling device and a sample preparation device, the remote sampling system configured to receive a liquid sample and prepare the liquid sample for analysis, the sample preparation device configured to at least one of dilute the liquid sample, add internal standard to the liquid sample, or pre-concentrate the liquid sample to yield a prepared liquid sample;

a sample transfer line configured to be fluidically coupled between the first location and the second location, the sample transfer line configured for coupling with a gas supply that is configured to provide a pressurized gas stream to transport and thereby drive the prepared liquid sample within the sample transfer line from the second location to the first location;

a detector system configured to monitor the sample receiving line to detect the presence or absence of the prepared liquid sample in the sample receiving line, the detector system including a first detector and a second detector, wherein the first detector is configured to detect that the prepared liquid sample entered the sample receiving line and the second detector is configured to detect that the sample receiving line is substantially filled via the prepared liquid sample; and a valve configured to, responsive to detection of the presence of a liquid sample segment of the prepared liquid sample in the sample receiving line, fluidically couple the sample receiving line with an analysis system to supply the liquid sample segment of the prepared liquid sample to the analysis system, wherein the liquid sample segment contains a portion of the prepared liquid sample.

2. The system of claim 1, wherein the detector system includes one or more of an optical sensor, a conductivity sensor, and a pressure sensor.

3. The system of claim 1, wherein the remote sampling system is configured to receive the liquid sample via operation of a pump included in the remote sampling device.

4. The system of claim 1, wherein the sample transfer line is at least five meters in length.

5. The system of claim 1, further comprising the analysis system, wherein the analysis system includes an inductively coupled plasma (ICP) spectrometer.

* * * * *